United States Patent [19]

Blank

[11] 4,057,523

[45] Nov. 8, 1977

[54] STABLE, AGED, COATING COMPOSITION

[75] Inventor: Werner Josef Blank, Stamford, Conn.

[73] Assignee: American Cyanamid Company, Stamford, Conn.

[21] Appl. No.: 324,687

[22] Filed: Jan. 18, 1973

Related U.S. Application Data

[63] Continuation of Ser. No. 130,524, April 1, 1971, abandoned.

[51] Int. Cl.$^2$ .............................................. C08L 61/20
[52] U.S. Cl. ............................ 260/29.4 UA; 204/181; 260/856
[58] Field of Search .............. 260/29.4 UA, 851, 856; 204/181

[56] References Cited

U.S. PATENT DOCUMENTS

| | | | |
|---|---|---|---|
| 3,471,388 | 10/1969 | Koral | 260/29.4 UA |
| 3,661,819 | 5/1972 | Koral et al. | 260/29.4 UA |
| 3,663,389 | 5/1972 | Koral | 260/29.4 UA |
| 3,707,584 | 12/1972 | Tulacs | 260/29.4 UA |
| 3,723,374 | 3/1973 | Pareich et al. | 260/29.4 UA |

*Primary Examiner*—Lorenzo B. Hayes
*Attorney, Agent, or Firm*—Frank M. Van Riet; James T. Dunn

[57] ABSTRACT

A stable, aged composition suitable for depositing a coating by electrophoresis comprising an aqueous dispersion of a mixture of from about 2% to about 60%, by weight, of (A) polymeric substantially water-insoluble, substantially fully etherified polymethylol melamines or guanamines and correspondingly from about 98% to about 40%, by weight, of (B) a water dispersible non-gelled polymeric material carrying an ionic charge which polymeric material contains at least one class of reactive groups, alcoholic hydroxy groups and amide groups wherein the amount of said groups is at least about 3%, by weight, and not more than about 30%, by weight, based on the total weight of said polymeric material wherein said groups are heat reactive with (A) wherein said percentages of (A) and (B), by weight, total 100% and are based on the total solids weight of (A) and (B).

7 Claims, No Drawings

STABLE, AGED, COATING COMPOSITION

This is a continuation, of application Ser. No. 130,524, filed Apr. 1, 1971 now abandoned.

This invention relates to the use of a composition of matter comprising an aqueous dispersion of a mixture of certain substantially water-insoluble, substantially fully etherified polymethylol melamines and an ionic water dispersible non-gelled, polymeric material which is heat reactive with said melamines. Still further, this invention relates to a composition of matter comprising an alkaline aqueous dispersion of a mixture of from about 2% to about 60%, by weight, of (A) polymeric, substantially water-insoluble, substantially fully etherified polymethylol melamines or guanamines and correspondingly from about 98% to 40%, by weight, of (B) a water dispersible non-gelled polymeric material carrying an ionic charge which is heat reactive with (A) wherein said percentages, by weight, total 100% and are based on the total solids weight of (A) and (B) as a coating.

One of the objects of the present invention is to utilize a composition of matter comprising an aqueous dispersion of a mixture of a polymeric substantially water-insoluble substantially fully etherified polymethylol melamine of guanamine and a water dispersible non-gelled polymeric material carrying an ionic charge, namely, either a cationic or anionic charge, which is heat reactive with said etherified polymethylol melamine or guanamine as a coating. A further object of the present invention is to produce an aqueous dispersion of an organic coating composition which can be applied to electroconductive metals by use of an electrodeposition or an electrocoating technique to uniformly coat the same. These and other objects of the present invention will be discussed in greater detail hereinbelow.

In the past, the methods used in painting metallic articles having irregularly shaped surfaces included hand or automatic spray painting, electrostatic painting, brushing or dipping. Electrophoretic techniques have been applied in coating articles having a relatively small surface area but these techniques have been restricted to the application of special coating materials. The present methods of applying a surface coating on large metallic articles have resulted in the waste of relatively large amounts of the coating due to overspraying or due to the accumulation of excess paint material along certain surfaces of the coated articles. Additionally, these coating techniques usually result in a relatively poor surface finish to the article being coated due to uneven distribution of paint or due to surface blemishes. A further shortcoming of the prior methods for applying a coating onto comparatively large metal articles resides in the fact that it has been rather difficult to obtain a relatively uniform film of paint over the entire surface of the electroconductive metal article. A further shortcoming resides in the fact that certain of the surfaces were not readily accessible to the application of the coating material which results in an unsatisfactory coating. Recessed areas such as the rocker panels of automobiles have only been coated by the prior art techniques at considerable expense because of the requirements of special coating techniques or special hand labor operations in order to obtain at least a minimum measure of protective coating against corrosion. The technique of dipping the metallic article in a paint bath to obtain a coating on recessed surfaces of a metallic article has not proven entirely satisfactory since the evaporation of solvents from the paint film has resulted in washing off a portion of the adhered paint coating.

It is, therefore, a principal object of the present invention to provide a composition of matter which can be used effectively in the coating of electroconductive metallic articles by the use of an electrophoretic technique which will provide a substantially uniform coating on all surfaces being treated. It is a further object of the invention to provide a coating composition containing substantially polymeric etherified polymethylol melamine capable of achieving enhancement in throwing power of a coating composition.

Reference is made to United States Letters Pat., No. 3,471,388, which discloses and claims a method for utilizing a mixture of (A) substantially monomeric etherified polymethylol-malamines and (B) an anionic or cationic polymer having pendant hydroxyl, carboxyl, amide groups as a composition in electrodeposition to uniformly coat a metallic surface. Unfortunately, this method is not entirely satisfactory, since the throwing power of that coating system is not sufficiently adequate for applications requiring high throwing power, as for instance in coating refrigerators, washing machines, car bodies and the like. The term "throwing power" as employed herein is defined as that which identifies the capacity of the system to deposit resin in locations which are remote either from the cathode electrode, if an anionic resin is used, or from the anode electrode, if a cationic resin is employed. Methods for determining throwing power are well known in the art as disclosed, for instance, in a publication of W. J. Blank et al. in Preprint Booklet Division of Organic Coatings and Plastics Chemistry, American Chemical Society Meeting, 28, page 276 (1968). If a method could be developed for increasing the throwing power, such method would fulfill a long-felt need.

It has been unexpectedly found that the throwing power can be substantially increased without attendant sacrifice in the coating bath stability by providing a polymeric amino-cross linking agent, the monomer of which is the type disclosed in the aforementioned patent. Utilizing such polymeric cross linking agents increases in throwing power of at least 30% higher than the utilization of the corresponding monomeric amino-cross linking agent can be attained.

In the coating composition of the present invention, there is blended a polymeric, water-insoluble, substantially fully etherified polymethylol melamine and a water dispersible non-gelled polymeric material carrying an ionic charge which is heat reactive with said melamine compounds. These two principal components are next blended in an aqueous solvent. The dispersion medium may consist of water alone or may contain additional solvents but, generally, water should be the preponderant member of the dispersion medium and, for economic reasons, the other possible solvents that could be used with water are omitted unless they are designed to serve some special function.

The component (A) is a polymeric, substantially water-insoluble, substantially fully etherified polymethylol melamine or guanamine. This component can be prepared by methods well known in the art. For instance, any of the monomeric, fully etherified alkylated hexamethylol melamines as set forth in U.S. Letters Pat. No. 3,471,388 may be employed. Such monomeric materials may either be polymerized as by adding a mineral acid, such as sulfuric acid or nitric acid and heating at an elevated temperature to effect polymerizaton or, the monomeric fully etherified material may be transetherified utilizing either an aliphatic linear or branched chain alcohol, such as n-butanol, t-butanol, dodecanol, stearyl alcohol and the like, or an alicyclic alcohol, such as cyclopentanol or cyclohexanol, said alcohols containing from 1–18 carbon atoms. In general, resultant polymers comprise at least 70 percent of a material having a molecular weight above 1000 and 40 weight percent with a molecular weight above 3000.

Exemplary polymeric materials are the polymers of: pentamethyl monoethyl ethers of hexamethylol melamine, tetramethyl, diethyl ethers of hexamethylol melamine, trimethyl triethyl ethers of hexamethylol melamine, dimethyl tetraethyl ethers of hexamethylol melamine, monomethyl pentaethyl ethers of hexamethylol melamine and the hexaethyl ethers of hexamethylol melamine. When propanols, including n-propanol as well as isopropanol, are used as the alkylating material, the following ethers may be present in the system or mixture: pentamethyl monopropyl ethers of hexamethylol melamine, tetramethyl dipropyl ethers of hexamethylol melamine, trimethyl tripropyl ethers of hexamethylol melamine, dimethyl tetrapropyl ethers of hexamethylol melamine, monomethyl pentapropyl ethers of hexamethylol melamine, and hexapropyl ethers of hexamethylol melamine. When the butanols are used, including normal butanol and isobutanol as the alkylating material, the blend of etherified hexamethylol melamines may include some or all of the following derivatives depending on the degree of methylation and the degree of butylation, namely, pentamethyl monobutyl ethers of hexamethylol melamine, tetramethyl dibutyl ethers of hexamethylol melamine, dimethyl tetrabutyl ethers of hexamethylol melamine, monomethyl, pentabutyl ethers of hexamethylol melamine and the hexabutyl ethers of hexamethylol melamine. When higher alkyl alcohols are employed as for instance octanol, decanol, dodecanol, octadecanol, the following ethers may be present in polymeric form as: hexaoctyl ethers of hexamethylol melamine, hexadodecyl (1) ethers of hexamethylol melamine, hexacyclohexyl ethers of hexamethylol melamine, tetracyclohexyl ethers of tetramethylol benzoguanamine, tetracyclopentyl ethers of tetramethylol formoguanamine, as well as the corresponding ethers of tetramethylol alkylguanamines, wherein the alkyl group contains from 1 to 18 carbon atoms such as methyl, ethyl, propyl, octyl, nonyl, dodecyl and octadecyl groups as well as the corresponding ethers of tetramethylol cyclohexyl guanamines.

The amount of substantially water-insoluble, polymeric, substantially fully etherified hexamethylol melamines employed in the composition of the present invention will vary between about 2% and about 60%, by weight, based on the total weight of said etherified hexamethylol melamines and the ionic water dispersible, non-gelled polymeric material which is heat reactive with said melamine compounds mixture. Correspondingly, in the composition there will be from about 98% to about 60%, by weight, of the ionic water dispersible non-gelled polymeric material which is heat reactive with said polymeric etherified polymethylol melamines or polymethylol guanamines, based on the total weight of said ionic polymeric material and said polymeric material. It should be apparent that all of the above percentages, by weight, will total 100%, by weight, and are based on the total solids weight of the melamine compounds and said ionic polymeric material. It is preferred to use between about 15% and about 25%, by weight, of the melamine or guanamine compounds and corresponding from about 85% and 75%, by weight, of the said ionic polymeric material, same basis.

The process for making a representative polymeric, substantially water-insoluble, substantially fully etherified polymethylol melamine or guanamine is set forth hereinbelow. These examples are set forth primarily for the purpose of illustration and no specific enumeration of detail contained therein should be interpreted as a limitation on the claims except as is indicated in the appended claims. All parts are parts, by weight, unless otherwise specified.

PREPARATION OF POLYMERIC ETHERS OF A POLYMETHYLOL MELAMINE

Preparation A

Into a suitable reaction vessel equipped with a thermometer, stirrer and condenser, there is introduced 688 parts of 44% formalin and the pH is adjusted to 7.1 at 40° C. with 1.1 part (by volume) of triethanolamine. The mixture is cooled to 28° C. while adding 210 parts of melamine thereto. The temperature was next increased to 50° C. under vacuum; 250 Parts of free water are removed. There is then added 464 parts n-butanol. To the resultant mass is next added 29 parts of butanol and 1 part (by volume) of 10% nitric acid while raising the temperature to 100° C. to permit the further removal of water by azeotropic distillation. When a $Z_2$–$Z_3$ viscosity of Gardner Holdt at 25° C. and a solids content of 58.5% is reached, 375 parts of butanol are added. Azeotropic distillation is continued until a temperature of 120° C. is achieved. At this point, 15 parts (by volume) of 10% sodium hydroxide are added. After vacuum stripping the reaction vessel, a polymeric, fully butylated ether of hexamethylolated melamine having a final viscosity of $Z_6$–$Z_7$ on the Gardner Holdt scale and a solids content of 97.5% is obtained.

On analysis by gel phase chromatography, the following data is noted in the table below.

TABLE I

| Molecular Size* | Area % |
|---|---|
| >3000 | 56.0 |
| 1350 | 4.6 |
| 1050 | 12.0 |
| 620 | 22.3 |

*Molecular size is determined employing methylated methylol melamine as a standard.

Preparation B 390 parts of hexa(methoxymethyl)melamine are charged into a suitable reactor and blended with 185 parts of 1-dodecanol and 12 parts of concentrated nitric acid. The mixture is stirred for 1 hour at 30°-35° C. and then slowly heated to 90° C. Methanol and methylal are distilled off. The reaction is continued until a sample taken from the reactor has a viscosity at 25° C. (Gardner Holdt) of $Z_1$–$Z_3$ (determined at 90% concentration dissolved in n-butanol). The reaction mixture is diluted with n-butanol to 85-90% solids and neutralized with sodium hydroxide. The salt is filtered out of the resin solution.

Preparation C 400 g. of a tetra(methoxymethyl) benzoguanamine are blended with 100 g. of cyclohexanol and 0.5 g. of p-toluene-sulfonic acid. The mixture is slowly heated to 100° C. The methanol split out during the reaction is collected. When 55 g. of methanol have been collected, the reaction mixture is neutralized with sodium hydroxide. After filtration the polymeric crosslinking agent is diluted with 2-ethoxyethanol to 80% solids.

The second component in the compositions of the present invention is a water dispersible, non-gelled polymeric material carrying an ionic charge or more precisely either an anionic or cationic charge.

The anionic water dispersible non-gelled polymeric material used in the composition of the present invention may be any one of a plurality of polymeric materials which have reactive sites that are heat reactive with the polymeric, etherified melamine or guanamine compounds. These reactive sites may be carboxyl groups and/or alcoholic hydroxyl groups and/or amide groups, which polymeric materials are the result of vinyl polymerization, epoxy polymerization, polyester compositions, or maleinised oils. These polymeric materials may be completely water soluble or they may be substantially water insoluble but which are capable of being dispersed in water. Sometimes it may be necessary to use appropriate surfactants to disperse these polymeric materials. The term "water dispersible", therefore, is intended to encompass both the aqueous solutions as well as dispersions in which the polymeric material is suspended in the aqueous medium. These anionic polymeric materials may contain, as the sole reactive sites, carboxyl groups or alcoholic hydroxyl groups or amide groups, or they may, in fact, contain all three.

When the polyester resins are used, they are prepared by reacting a polycarboxylic acid including dicarboxylic acids with a polyhydric alcohol, including the glycols. The polycarboxylic acids may be either saturated, i.e., free of nonbenzenoid unsaturation, or they may be $\alpha, \beta$-ethylenically unsaturated.

If the polyester resins as used contain preponderant amounts of the polycarboxylic acid, such polyester should be reacted until an acid number of not less than about 35-40 is reached and, preferably, to an acid number of between about 50 and 150. If the polyester resin is prepared by using a preponderance of alcoholic hydroxyl groups, the ingredients forming the polyester are permitted to react until a hydroxyl number of not less than about 35-40 is reached and, preferably, between about 50 and 150.

When these anionic polymeric materials are prepared and dispersed in water, they may be rendered alkaline by adjusting the pH to a point above 7 to about 11 and, preferably, to a pH above about 7.1 to about 9. This adjustment of the pH is accomplished on the anionic polymeric material before the etherified polymethylol melamine compounds are added and then, if necessary, the pH is readjusted to a point within the ranges set forth hereinabove.

The maleinised oils are water soluble or water dispersible and are prepared by reacting unsaturated glyceride oils with an acid or anhydride dienophile such as maleic anhydride. Other acids or anhydride dienophile have also been used and these include acrylic acid, crotonic acid and the like. These water solubilized oils were discussed by J. J. Hopwood at the Sixth Australian Convention, Warburton, 16-19, July 1964, and a paper has been published entitled "Water Soluble Thermosetting Organic Polymers" in the Journal of the Oil and Colour Chemists Association, February, 1965, pages 157-171, inclusive, which reference is incorporated herein by reference.

All of these anionic water dispersible non-gelled polymeric materials having carboxyl groups and/or alcoholic hydroxyl groups and/or amide groups have water sensitive sites obviously, by virtue of the presence of these groups and these water sensitive sites should all be tied up by interreaction with the etherified polymethylol melamine compounds in a cross-linking mechanism. Before the cross-linking takes place, the melamine compounds also function as plasticizers for the total composition.

The anionic polymeric materials prepared by vinylpolymerization may be prepared in either an aqueous solution, an organic solvent, or in an aqueous emulsion system, all of which procedures are thoroughly well known in the art, and it is not deemed necessary to elaborate on such procedures here.

The vinyl polymers may be prepared by polymerizing polymerizable monomers such as acrylic acid, methacrylic acid, crotonic acid, cinnamic acid, $\beta$-benzoyl acrylic acid, and polycarboxylic acids of the $\alpha, \beta$-ethylenically unsaturated class such as maleic, fumaric, itaconic, mesaconic, ataconic, and the halogenated acids such as halogenated maleic or, more specifically, chloromaleic acid, and the like. These acidic materials may be copolymerized or polymerized with other monomers which contain no carboxyl groups such as methyl acrylate, ethyl acrylate, propyl acrylate, butyl acrylate, octyl acrylate, decyl acrylate, lauryl acrylate, methyl methacrylate, ethyl methacrylate, butyl methacrylate, heptyl methacrylate, decyl methacrylate, propyl crotonate, butyl crotonate, nonyl crotonate, and the like. Still further, one could use such polymerizable compounds as styrene, ortho-, meta- or para-alkyl styrenes such as the o-, m- or p-methyl, ethyl, propyl and butyl styrenes, 2,4-dimethyl styrene, 2,3-dimethyl styrene, 2,5-dimethyl styrene, vinyl naphthenate, acrylonitrile, methacrylonitrile, halo ring or side chain styrenes, such as $\alpha$-halo styrenes, as-, meta- or para-chloro-styrenes 2,4-dichlorostyrene, 2,3-dichlorostyrene, 2,5-dichlorostyrene or the alkyl side chain styrenes such as $\alpha$-methyl styrene, $\alpha$-ethyl styrene, and the like. Additionally, one can make use of such polymerizable vinyl monomers as acrylamide, methacrylamide, ethacrylamide, ethylene-bisacrylamide, N-tertiary-butylacrylamide and the like.

The anionic polymeric materials containing alcoholic hydroxyl groups are prepared by using a polymerizable vinyl monomer which contains an alcoholic hydroxyl and is to be found in such compounds at the hydroxyalkyl esters of $\alpha, \beta$-unsaturated monocarboxylic acids, such as the hydroxy alkyl esters of acrylic acid, methacrylic, ethacrylic and chloro as well as the other chlorosubstituted acrylic acids. These esters may either have a primary or a secondary hydroxyl group. Illustrative of the types of compounds that are used to make the copolymers in the anionic, polymeric material are 2-hydroxyethyl acrylate, 2-hydroxy propyl acrylate, 3-hydroxypropyl acrylate, 2-hydroxybutyl acrylate, 3-hydroxybutyl acrylate, 4-hydroxybutyl acrylate, 8-hydroxyoctyl acryalte, 2-hydroxyethyl methacrylate, 5-hydroxy-hexylmethacrylate, 6-hydroxyoctylmethacrylate, 8-hydroxy-octylmethacrylate, 10-hydroxydecylmethacrylate, 3-hydroxypropyl crotonate, 4-hydroxyamyl crotonate, 5-hydroxyamyl crotonate, 6-hydroxyhexyl crotonate, 7-hydroxyheptyl crotonate, 10-hydroxydecyl crotonate, and the like. These hydroxy esters may be used either singly or in combination with one another with other polymerizable vinyl monomers devoid of any alcoholic hydroxyl group including those set forth hereinabove in the discussion of the carboxyl group containing monomers.

Among the amide group-containing monomers which may be used in the preparation of the anionic, water dispersible, polymeric material used in the present invention are acrylamide, methacrylamide, ethacrylamide, and the like. These polymerizable acrylamides may be used to prepare anionic polymeric materials used in the present invention with any of the carboxyl group-containing monomers or the hydroxyl group-containing monomers or with any of the polymerizable monomers set forth hereinabove.

In general, one can make use of polyester resin compositions which are water dispersible non-gelled anionic polymeric materials. Water soluble alkyd resins or water dispersible alkyd resins, whether oil free or glyceride oil containing may be used and a plurality of these materials are commercially available and are also well known in the art and, as a consequence, it is not deemed necessary to make any prolonged recitation of such materials since they are fundamentally prepared by reacting a polyhydric alcohol with a polycarboxylic acid or with anhydrides such as phthalic anhydride, maleic anhydride, and the like.

Additionally, one can make use of epoxy esters as the anionic polymeric material in which the epoxy resins, which contain a plurality of hydroxyl groups, are reacted with glyceride oil fatty acids and then further reacted with maleic anhydride to yield a dispersion in an alkaline medium. Still further, one can make use of polyamides which are prepared by reacting alkylene polyamines with excess dicarboxylic acids to produce water soluble and water dispersible anionic polymeric materials.

A variety of emulsion anionic polymers may be used in the composition of the present invention, wherein the utilization of a variety of anionic surfactants or emulsifiers such as soaps and alkyl sulfonates are used to impart a charge characteristic to the emulsion particles which will result in the migration of such particles in electric fields. These same surfactants and in combination with a variety of nonionic surfactants can be used to post-emulsify a variety of epoxy esters, saturated and unsaturated alkyd resins and acrylic resins to prepare charged emulsion particles.

In order to illustrate the preparation of an anionic carboxyl group-containing polymer, the following example is set forth in which all parts are parts, by weight, unless otherwise indicated.

Preparation D

CARBOXYL GROUP-CONTAINING POLYMERS

[I] Into a suitable reaction vessel equipped with stirrer, thermometer and reflux condenser, 100 parts of dioxane are added thereto. The charge is heated gradually to the reflux temperature by heating on an oil bath. After the dioxane has reached reflux, a mixture of 750 parts of butyl acrylate, 150 parts of acrylic acid and 100 parts of a 1% solution of butyl mercaptan in butyl acrylate are introduced in relatively small increments over a 2 hour period. Concurrently but separately, over the same period of time, there is added 12.2 parts of cumene hydroperoxide. After the addition is completed, reflux is continued for about 5 hours. 200 parts of the copolymer thus prepared are dissolved in 220 parts of a mixture of 1 part of concentrated ammonia (29% $NH_3$) to 4 parts of water. An additional 80 parts of water is added to give an aqueous solution of 36% solids concentration of the copolymer. The solvent dioxane is used in the present example in an amount approximately 10% of the total charge. At the end of the polymerization reaction, this solvent may be stripped off under vacuum but it is preferred to leave said solvent in since its removal is not economically justifiable and since this solvent is completely water miscible.

[II] Into a suitable reaction vessel, equipped with thermometer, stirrer, reflux condenser, a nitrogen inlet tube and a dropping funnel as in (I) above, there is introduced 50 parts of the hexyl ether of ethylene glycol, 275 parts of butyl acrylate, 150 parts of styrene, 75 parts of acrylic acid, 10 parts of ditertiary butyl peroxide, 10 parts of dodecyl mercaptan, in the order indicated hereinbelow. The hexyl ether of ethylene glycol is charged into the reaction vessel first and is heated to 150° C. and nitrogen is blown over the solvent so as to provide a blanket. There is then added the blend of the butyl acrylate, styrene, acrylic acid, peroxide and mercaptan through the dropping funnel. The monomer mixture is fed into the reaction vessel at the rate of about 4 parts per minute after the solvent reaches 150° C. After two or three minutes, the polymerization begins. The incremental addition of the catalyzed monomer mixture is continued into the reaction vessel and the temperature is maintained between about 140° C. and 150° C. After all of the catalyzed monomer is fed into the reaction vessel, the reaction mixture is held for two hours at 140°–150° C. in order to assure complete conversion of all monomer. The reaction mixture is then cooled to about 110°–115° C. and further diluted with 80 parts of the methyl ether of ethylene glycol.

[III] Into a suitable reaction vessel equipped with a thermometer, stirrer, inert gas, inlet and outlet tubes, as in (I) above, there are introduced 150 parts of tall oil fatty acids and the acid number of the charge is taken. There is then added 36.5 parts of otunol, which chemically is 3-oxatetra cyclo $(4.4.1^{7,10}0^{1,6}0^{2,4})$ undecan-8(9)-ol. of the blend is determined. The acid number of the blend should be about 80.5. The charge is then heated under an inert blanket of nitrogen gas or carbon dioxide to a temperature of 230°–235° C. using an open stack. The charge is held for five hours at that temperature. After the five hour period the acid number is determined every hour and when the acid number drops to below about 10 the mass is cooled to about 200° C. and the viscosity reading is taken on a sample on the Gardner-Holdt scale at 25° C. The inert gas flow is reduced and it is switched to an inert blanket. There is then added 22 parts of maleic anhydride while the mass is held at around 200°–210° C. The mass with constant stirring is heated over a period of time from 15 to 30 minutes to a temperature of 230°–235° C. When the charge reached 230°–235° C. it is held at that temperature for about 90 minutes. Thereupon the mass is cooled to about 145°–150° C. and viscosity determinations are taken on samples again under the Gardner Holdt scale at 25° C. A reflux condenser is then attached to the reaction system followed by the addition of 22 parts of diacetone alcohol, an inert organic solvent and the mass is then refluxed at about 145°-150° C. The batch is maintained at 145°-150° C. There is prepared separately a blend of 77 parts ditertiarybutyl peroxide and 0.44 parts of n-dodecylmercaptan. The blend of these components is then fed into the reaction system over a period of about 100-120 minutes. The reflux is maintained throughout the whole reaction. The temperature drops slightly during the addition of the blend to about 135°-140° C. After the addition is finished the batch is then held at about 135°-140° C. for about two hours. After the holding period, the batch is cooled to about 110° C. and there is added 75 parts of secondary butanol, an inert organic solvent. The final product had a Brookfield viscosity at 25° C. of 50-150 poises and on the Gardner-Holdt scale at 25° C., the viscosity was $Z_3-Z_6$; color on the Gardner scale is < 8 and had an acid number of 80.

Preparation E

AN ALCOHOLIC HYDROXYL GROUP-CONTAINING-POLYMER

Into a suitable reaction vessel equipped with a thermometer, stirrer, condenser, and two additional funnels, there is added 440 parts of deionized water, 3.4 parts of sodium bicarbonate, and 2.0 parts of sodium lauryl sulfate. The mixture is heated to about 90° C. whereupon a catalyst solution containing 2.25 parts of ammonium persulfate dissolved in 110 parts of deionized water is prepared and 12 parts of this solution are added to the reaction vessel. This is followed by the addition of 90 parts of said catalyst solution uniformly over a two hour period in comparatively small increments to the reaction vessel. Concurrently, but separately, a monomer mixture of 170 parts of styrene, 235.6 parts of ethyl acrylate, 4.5 parts of acrylic acid and 32 parts of hydroxyethyl methacrylate is added uniformly over the same two hour period through a separate funnel. The remainder of the catalyst solution is then added to the reaction vessel and the mixture is heated at 90° C. for an additional one hour period. The reaction mixture thus prepared was analyzed and was shown to have a polymer solids of 48%.

PREPARATION F

AMIDE-CONTAINING ANIONIC POLYMER

Into a suitable reaction vessel equipped with a thermometer, stirrer, condenser, and two addition funnels, there is introduced 348 parts of deionized water, 1.85 parts of sodium lauryl sulfate, and 4.08 parts of sodium bicarbonate. The reaction mixture is heated to 90° C. whereupon a catalyst solution containing 2.7 parts of ammonium persulfate in 115 parts of deionized water is prepared and 12 parts of this catalyst solution is introduced into the reaction vessel. Thereupon, 90 parts of said catalyst solution is added uniformly in comparatively small increments over a 2 hour period to the reaction vessel. Concurrently during said 2 hour period, but separately, there is added a monomer mixture of 212 parts of styrene, 293 parts of ethyl acrylate, 5.3 parts of acrylic acid, 21 parts of acrylamide, 0.75 part of sodium lauryl sulfate and 348 parts of deionized water over this same two hour period. The remainder of the catalyst solution is then added to the reaction vessel and the mixture is heated at 90° C. for an additional one hour period. The reaction mixture thus prepared was analyzed and revealed a polymer solids of 37.6%.

The cationic water dispersible non-gelled polymeric materials used in the composition of the present invention may be any one of a plurality of polymeric materials which have reactive sites that are heat reactive with the melamine compounds used in the composition of the present invention. As in the anionic materials, these reactive sites may be either carboxyl groups and/or alcoholic hydroxyl groups and/or amide groups, which polymeric materials may be the result of vinyl polymerization. Therefore, all of the polymerizable monomers in each of these three principal classes may be used to prepare the cationic polymeric materials used in the present invention. Still further, these polymerizable monomers may be used with other polymerizable monomers such as the esters, styrenes, nitriles, and the like, all of which have been set forth hereinabove in significant detail in the discussion of the constitution of the anionic polymeric materials. The melamine compounds used in the composition of the present invention exhibit good migration characteristics with a wide variety of cationic polymeric materials. These cationic polymeric materials can be broadly described as being selected from any one of the following classes: acrylic polymers, of which a substantial variety are vinyl and acrylic monomers and can be copolymerized with amino acrylates and methacrylates such as dimethylaminoethyl methacrylate and the like. These polymers can be dissolved or dispersed in water with the addition of a water dispersible acid such as hydrochloric acid, acetic acid, and the like. It must be kept in mind that these polymers should also contain some —OH and/or —COOH and/or

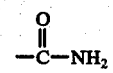

groups which can be obtained by copolymerizing vinyl monomers with comparatively small amounts of such polymerizable monomers as hydroxyethyl methacrylate and/or acrylic acid or acrylamide. In this same broad classification, the amino methacrylates may be replaced by methylvinyl pyridine, and the like. Polymers containing this type of amine monomer can also be water dispersed by the addition of such water dispersible acids such as hydrochloric and acetic acids. The formation of the quaternary amine salt results in the water solubility or water dispersibility.

Another illustrative class of water dispersible non-gelled polymeric materials carrying a cationic charge and which material is heat reactive with the melamine compounds such as the reaction product of isopropylidine-4,4'-bisphenol with epichlorohydrin and then reacting with a polyfunctional amine such as diethylenetriamine, ethylene diamine, iminobispropylamine and the like to yield cationic polymers which can be water dispersed or dissolved upon addition of various water dispersible acids such as hydrochloric or acetic acids. The adjustment of the charged mole ratio of amine to epoxy compound will control the amount of hydroxy groups that will be available for cross-linking with the melamine compounds.

Another class of water dispersible non-gelled polymeric material carrying cationic charges which are heat reactive with the melamine compounds used in the present invention are those prepared by reacting dibasic ortribasic organic acids with polyfunctional amines and with polyols which result in cationic polymers if sufficient polyfunctional amine is used in the initial charge.

These polymers will be water soluble or dispersible with the addition of the aforementioned water dispersible acids and the formation of quaternary salts. These cationic polymers will also contain some free hydroxyl and/or carboxyl groups depending on the initial charge. A plurality of such water dispersible acidified polymers are prepared by the condensation of dimer acids with polyfunctional amines wherein the dimer acids are prepared by dimerizing a long chain fatty acid containing ethylenic unsaturation, thereby providing a substance which results in the formation of a bridged long chain fatty dicarboxylic acid.

Another class of water dispersible non-gelled polymeric materials which carry a cationic charge and which are heat reactive with the melamine compounds used in the present invention are the cationic urea formaldehyde resins. These condensation products are prepared by reacting urea and formaldehyde with polyfunctional amines to produce cationic resins which are water dispersible upon the addition of a water dispersible acid such as hydrochloric acid or acetic acid. These polymers are cationic and will move to the cathode in an electric field. Still further, these cationic polymers will have free methylol groups available for said reactive crosslinking with the melamine compounds used in the composition of the present invention.

A further category of water dispersible non-gelled polymeric materials which carry a cationic charge and which materials are heat reactive with the melamine compounds of the present invention are the polyethyleneimines. These polymeric materials are classical cationic polymers when treated with water dispersible acids in an aqueous system. The category of cationic polymers can be provided with reactive alcoholic hydroxyl groups simply by reacting the polyethyleneimine with controlled amounts of ethylene oxide. This modified cationic polymer will then move in the electric field and can be heat reacted with the melamine compound during the curing reaction.

The following example illustrates a process for preparing a water soluble cationic epoxy amine resin.

Preparation G

WATER SOLUBLE CATIONIC EPOXY AMINE RESIN

A mixture of 400 parts of a resinous reaction product prepared by reacting 4,4-dihydroxydiphenyldimethylmethane with epichlorohydrin having an epoxide average equivalency of 487 and 156 parts of tetraethylene pentamine are introduced into 400 parts of toluene at room temperature and then heated to reflux. After refluxing for one hour, the toluene and the unreacted tetraethylene pentamine are removed by distillation under reduced pressure finishing at about 175° C. and 3.5 mm./mercury pressure. An aqueous solution containing 30% of this resin is obtained by neutralizing the resin with an equivalent amount of dilute acetic acid and has a viscosity of 0.5 poise at 25° C.

In the water dispersible non-gelled polymeric material carrying either a cationic or anionic charge, the amount of carboxyl groups and/or alcoholic hydroxyl groups and/or amide groups should be at least about 3%, by weight, based on the total weight of the polymeric material and not greater than about 30%, by weight, based on the total weight of the polymeric material. Preferably, one would use between about 5% to about 20%, by weight, based on the total weight of the polymeric material of the carboxyl-containing monomer and/or the alcoholic hydroxyl-containing monomer or the amide-containing monomer. These precentages, by weight, prevail whether the individual monomer-containing carboxyl groups, alcoholic hydroxy-groups, or amide groups are the sole reactive groups present and whether they are present in any of the above combinations.

As before, the following examples are set forth primarily for the purposes of illustration and any specific enumeration of detail contained therein should not be interpreted as a limitation. All parts are parts, by weight, unless otherwise indicated.

EXAMPLE 1

Eighty-two parts of the terpolymer solution prepared as Preparation D (II) above, are blended with 16 parts of polymeric amino cross-linker as prepared in Preparation A above. There is then added 23 parts of rutile titanium dioxide and 6 parts of diisopropanolamine. The resulting paste is ground on a three roll mill and the paste is emulsified in 860 parts of deionized water. The mixture is then thoroughly agitated to produce a low viscosity emulsion which is placed in a glass tank and aged for two days. Two electrodes are inserted therein. One of the electrodes was zinc phosphated steel substrate as the anode and the other is stainless steel as the cathode. A DC voltage with a potential difference of 300 volts for three minutes is applied between both electrodes. The anode is coated with a 0.8 mil film of paint. After rinsing off any excess of the bath liquid with deionized water, the film is baked at 175° C. for 20 minutes. The baked film is hard, of high elasticity and has excellent corrosion resistance. The throwing power is measured by the method of Blank et al, above-identified, and found to be 25 cm. If desired, the anode can be another appropriate metal substrate, such as cold-rolled steel, aluminum, and the like.

COMPARATIVE EXAMPLE 2

The procedure of Example 1 is repeated in all essential details in the same type of reaction vessel, except that for the polymeric cross-linking agent, there is substituted 16 parts of the corresponding monomeric cross-linking amino agent. The latter agent, on analysis by gel phase chromatography, exhibits a molecular weight of which not more than 80–90 weight percent is above 650 and not more than 20 to 10 weight percent is above 1050.

The throwing power obtained is 15 cm., a decrease of more than 40% as compared with the throwing power obtained in Example 1 above.

EXAMPLE 3

Eighty-eight parts of a 75% solution of a polyester which is the reaction product of a tall oil fatty acid with a trifunctional polyol derived from dicyclopentadiene which has been maleinized and then, in a second step, reacted with styrene and acrylic acid as prepared in Preparation D (III) above, and 20 parts of the amino cross-linking agent as prepared in Preparation B above are blended with 3.5 parts of diethylamine and 27 parts of an iron oxide red pigment. The mixture is ground on a three roll mill and emulsified in 860 parts of deionized water. After an aging time of 24 hours, the following tests were commenced. Cold-rolled steel panels were electrodeposited as described in Example 1 above. At a voltage of 400 volts for two minutes, the film thickness obtained was 0.5 mil. The panels were baked at 175° C. for 20 minutes. The panels had a Knoop hardness of 18.0 and an impact resistance of 50 in. lbs.

In a comparative test in which monomeric tetra (ethoxy methyl) di (methoxy methyl)-melamine is used in lieu of the corresponding polymeric compound, there is obtained a Knoop hardness of 17.5, an impact hardness of 50 in. lbs., and a throwing power which is 40% lower than the value observed when the polymeric cross-linker is employed.

EXAMPLE 4

Ninety-six parts of an acrylic terpolymer solution as described in Preparation D (II), above, are blended with 10 parts of the cross-linking agent described in Preparation C, above, together with 6.8 parts of diisopropanolamine and 2 parts of titanium dioxide. The mixture is dispersed on a high speed dissolver and emulsified in 850 parts of deionized water. After an aging period for this bath of 48 hours cold-rolled steel panels pretreated with a zinc phosphate coating are electrodeposited at a potential difference of 300 volts for two minutes. The deposited film is rinsed with deionized water and baked for 10 minutes at 400° F.

The deposited film has a film thickness of 0.6 mil, a Knoop hardness of 7.0, and an impact resistance of 60 in. lbs. Throwing power tests performed on this system gave a throw of 24 cm.

Throwing power test made with the same paint formulation as in Example 3, but replacing the polymeric cross-linking agent with monomeric tetra (methoxymethyl) benzoguanamine gave a throw of only about 13 cm.

I claim:

1. A stable, aged composition suitable for depositing a coating by electrophoresis comprising: an aqueous dispersion of a mixture of from about 2% to about 60%, by weight, of (A) a polymeric, water insoluble, substantially fully etherified polymethylol melamine or guanamine, said polymeric material having at least 70% of its molecular weight above about 1,000 and at least 40% of its molecular weight above about 3,000 by weight, and correspondingly from about 98% to about 40% of (B) a water dispersible non-gelled polymeric material carrying an ionic charge which polymeric material contains at least one class of reactive groups selected from the group consisting of carboxyl groups, alcoholic hydroxy groups and amide groups wherein the amount of said groups is at least about 3%, by weight, and not more than about 30%, by weight, based on the total weight of said polymeric material; wherein said groups are heat reactive with (A) and wherein said percentages of (A) and (B), by weight, total 100% and are based on the total solids weight of (A) and (B).

2. A composition according to Claim 1 in which the aqueous dispersion is alkaline and in which the water dispersible non-gelled polymeric material carries an anionic charge.

3. A composition according to Claim 2 in which said anionic polymeric material contains carboxyl groups.

4. A composition according to Claim 2 in which said aniionic polymeric material contains hydroxyl groups.

5. A composition according to Claim 2 in which said aniionic polymeric material contains amide groups.

6. A composition according to Claim 2 in which said polymeric fully etherified material is a polymeric etherified melamine.

7. A composition according to Claim 2 in which said anionic polymeric fully etherified material is a polymeric etherified guanamine.

* * * * *